UNITED STATES PATENT OFFICE.

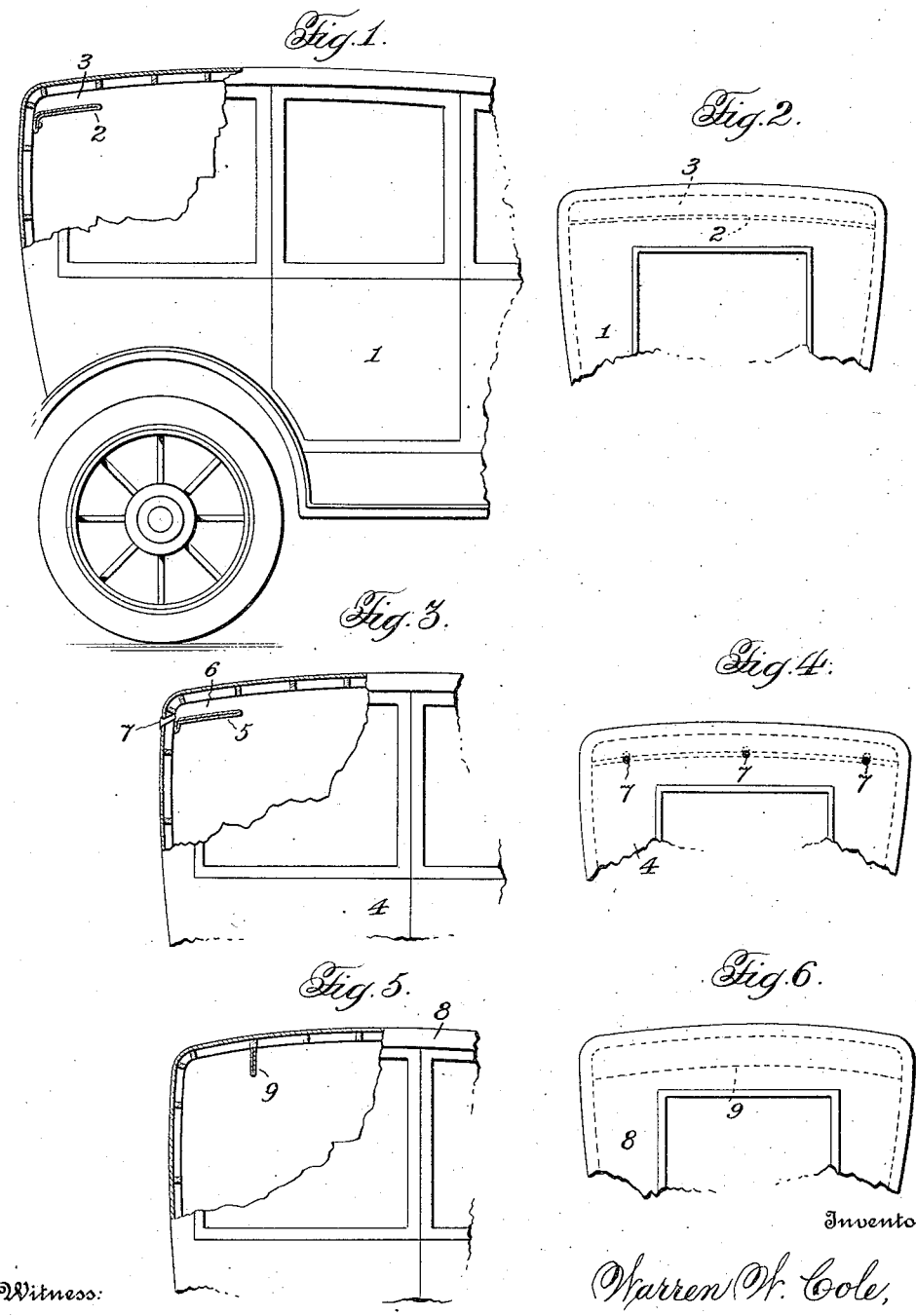

WARREN W. COLE, OF PORTLAND, MAINE.

AIR DEFLECTOR FOR AUTOMOBILES.

1,418,430.  Specification of Letters Patent.  Patented June 6, 1922.

Application filed June 23, 1920. Serial No. 390,995.

*To all whom it may concern:*

Be it known that I, WARREN W. COLE, citizen of the United States, residing at Portland, in the county of Cumberland and State of Maine, have invented certain new and useful Improvements in Air Deflectors for Automobiles, of which the following is a specification, reference being had therein to the accompanying drawing.

My invention relates to new and useful improvements in an automobile body and more particularly to an air deflector for use in the interior of an automobile body of the closed type.

The principal object of my invention resides in the provision of an air deflector so positioned in the interior of an automobile body as to prevent a current of air from passing down the rear end of the body, causing discomfort to the occupant or occupants of the rear seat.

A further object of the invention is the provision of such a device, inexpensive and simple in construction, and which may be easily secured to automobile bodies at present in use or secured to or formed a part of new bodies.

With the above and other objects in view, which will appear as the description proceeds, my invention consists of novel details of construction and arrangement of parts which will be more clearly understood from the following specifications and drawings in which:—

Figure 1 is a fragmental side elevation, with parts broken away, of an automobile body showing my deflector in position, Figure 2 is a fragmental rear end view of automobile body showing, in dotted lines, the position of the deflector, Figure 3 is a view similar to Figure 1, showing a slightly modified form of the invention, Figure 4 is a view similar to Figure 2 of the modified form of the invention shown in Figure 3, Figure 5 is a view similar to Figure 1 of a still further modified form, and Figure 6 is a view similar to Figure 2 of the modified form of the invention shown in Figure 5.

As previously stated, my invention relates to an air deflector for use in the interior of an automobile body, of the closed type. In automobiles of the closed type, if the windshield or a window is opened, a draft is created and causes discomfort to the occupant or occupants of the rear seat. The air admitted follows the top of the body to the rear end, where it passes down and blows against the persons occupying the rear seat, causing much discomfort. My deflector interrupts the air current to prevent it from passing down the rear of the body.

In the drawings 1 indicates an automobile body, of the closed type, and 2, the deflector. In the preferred form of the invention, as illustrated in Figures 1 and 2, the deflector 2 is in the form of a horizontal shelf secured to the rear end of the body and extending forwardly. As shown, this horizontal shelf is spaced from the top of the body so as to leave the space 3 to receive the air currents. The shelf, or deflector, 2, is preferably made of aluminum and covered with the same material as the lining of the body. However, it will be understood that various other materials might be used to answer the same purpose. As shown in Figure 2, the shelf extends the full width of the body and the ends are secured to the sides of the body, if desired.

In the form of the invention illustrated in Figures 1 and 2, when the windshield or a window is opened, the air current follows the top of the body and will pass into the space 3 between the shelf 2 and the top of the body. This will prevent the air from passing down the rear end of the body against the persons occupying the rear seat.

In Figures 3 and 4 I have shown a slightly modified form of my invention in which 4 is the body, of the closed type, and 5 is the deflector secured thereto in the same manner as described in the form illustrated in Figures 1 and 2.

In this form of the invention, the space 6 is left between the deflector and the top of the body and a plurality of openings 7 extend through the rear end of the body and communicate with the space 6. The air currents following the top of the body will pass over the deflector 5 and out through the openings 7, thereby preventing the air from passing down the rear end of the body to cause discomfort to the occupants of the rear seat. The deflector 5 extends the full width of the body and the ends thereof may be secured to the sides of the body.

A still further modification of the invention is shown in Figures 5 and 6. In this modified form the automobile body, of the closed type, is shown as 8 and the deflector as 9, secured to the interior thereof.

In this modified form the deflector 9 is in the form of a depending plate or strip secured to the top of the body and spaced from the rear end. The plate preferably extends about three inches from the top and may be made of metal, cardboard, fabric, or like stiff materials, covered with the same material as the lining of the body. The air currents passing along the top of the body will engage the depending deflector and be directed downwardly in front of the occupants of the rear seat. As shown in Figure 6, the depending deflector extends the full width of the body and the ends thereof, if desired, may be secured to the sides of the body.

From the detailed description it will be seen that I have provided a deflector which will prevent air currents from passing down the rear end of the automobile body, to cause discomfort to the occupants of the rear seat and while I have shown and described the preferred embodiments, it will be understood that slight changes might be made so as to fall within the scope of the appended claims.

Having fully described my invention, what I claim as new and desire to secure by Letters Patent is:—

1. An automobile body having a deflector secured to the interior thereof in such a position as to prevent a current of air from passing down the rear end of the body.

2. An automobile body having an inwardly extending deflector secured to the rear end and spaced from the top.

3. An automobile body having a horizontal shelf secured to the inner face of the rear end of the body and spaced from the top, said shelf extending to the sides of the body.

4. An automobile body having a horizontal shelf secured to the inner face of the rear end and spaced from the top, the end being provided with perforations between the top and the shelf.

In testimony whereof I hereunto affix my signature in the presence of two witnesses.

WARREN W. COLE.

Witnesses:
FRANK L. RICKER,
HELEN A. LEAVITT.